United States Patent
Bank et al.

(10) Patent No.: US 9,070,170 B2
(45) Date of Patent: Jun. 30, 2015

(54) HELP FOR READING AN E-BOOK

(71) Applicant: International Business Machines Corporation, Armonk, NY (US)

(72) Inventors: Judith H. Bank, Cary, NC (US); Lisa M. W. Bradley, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 13/832,794

(22) Filed: Mar. 15, 2013

(65) Prior Publication Data

US 2014/0281960 A1 Sep. 18, 2014

(51) Int. Cl.
*G06F 3/00* (2006.01)
*G06Q 50/00* (2012.01)
*G06F 15/02* (2006.01)
*G06Q 10/10* (2012.01)
*G09B 7/00* (2006.01)

(52) U.S. Cl.
CPC ............ *G06Q 50/01* (2013.01); *G06F 15/0291* (2013.01); *G06Q 10/101* (2013.01); *G09B 7/00* (2013.01)

(58) Field of Classification Search
CPC ...... G06F 9/4446; G06F 3/048; G06F 3/0481
USPC .......................................................... 715/705
See application file for complete search history.

(56) References Cited

U.S. PATENT DOCUMENTS

| | | | | |
|---|---|---|---|---|
| 2002/0147593 | A1* | 10/2002 | Lewis et al. | 704/275 |
| 2003/0208613 | A1* | 11/2003 | Signes et al. | 709/231 |
| 2003/0227479 | A1* | 12/2003 | Mizrahi et al. | 345/753 |
| 2010/0274575 | A1* | 10/2010 | Lemke et al. | 705/2 |
| 2011/0129808 | A1* | 6/2011 | Srivastava | 434/322 |
| 2012/0151351 | A1 | 6/2012 | Kilroy et al. | |
| 2012/0245952 | A1* | 9/2012 | Halterman et al. | 705/2 |
| 2014/0258414 | A1* | 9/2014 | Kitano | 709/204 |

FOREIGN PATENT DOCUMENTS

JP  2012118773  6/2012

* cited by examiner

*Primary Examiner* — Boris Pesin
*Assistant Examiner* — Angie Badawi
(74) *Attorney, Agent, or Firm* — Law Office of Jim Boice

(57) ABSTRACT

A computer-implemented method, system, and/or computer program product shares information related to passages from an electronic book. An electronic book is opened to a user-selected initial passage. A passage block within the electronic book, which starts at the user-selected initial passage and ends at a community-selected terminal passage, is defined. A determination is made that members of the social community who have read the passage block have input a high incidence of incorrect answers to questions about the passage block, where the high incidence is greater than a predetermined value. Thereafter, additional help is provided to the user of the electronic book, where the additional help is information that members of the social community have deemed to be useful in correctly answering questions that had the high incidence of incorrect answers.

17 Claims, 3 Drawing Sheets

HELP FOR READING AN E-BOOK

BACKGROUND

The present disclosure relates to the field of computers, and specifically to the use of computers for displaying electronic books (e-books). Still more particularly, the present disclosure relates to aiding a reader in understanding a passage from an e-book.

An electronic book, also known as an "e-book", is an electronic version of a printed book. An e-book may contain more or fewer illustrations and other features found in the printed version of the book. E-books are readable on computers and/or dedicated portable devices, including smart phones, tablet computers, and/or dedicated e-book readers (a.k.a. "e-readers") that are specifically designed to display e-books. The e-book can be streamed to the e-reader (e.g., from a remote memory cloud), or the e-book can be downloaded to the e-reader, where it is stored within a local memory.

SUMMARY

A computer-implemented method, system, and/or computer program shares information related to passages from an electronic book. An electronic book is opened to a user-selected initial passage. A passage block within the electronic book, which starts at the user-selected initial passage and ends at a community-selected terminal passage, is defined. A determination is made that members of the social community who have read the passage block have input a high incidence of incorrect answers to questions about the passage block, where the high incidence is greater than a predetermined value. Thereafter, additional help is provided to the user of the electronic book, where the additional help is information that members of the social community have deemed to be useful in correctly answering questions that had the high incidence of incorrect answers.

DETAILED DESCRIPTION

Figure 1:
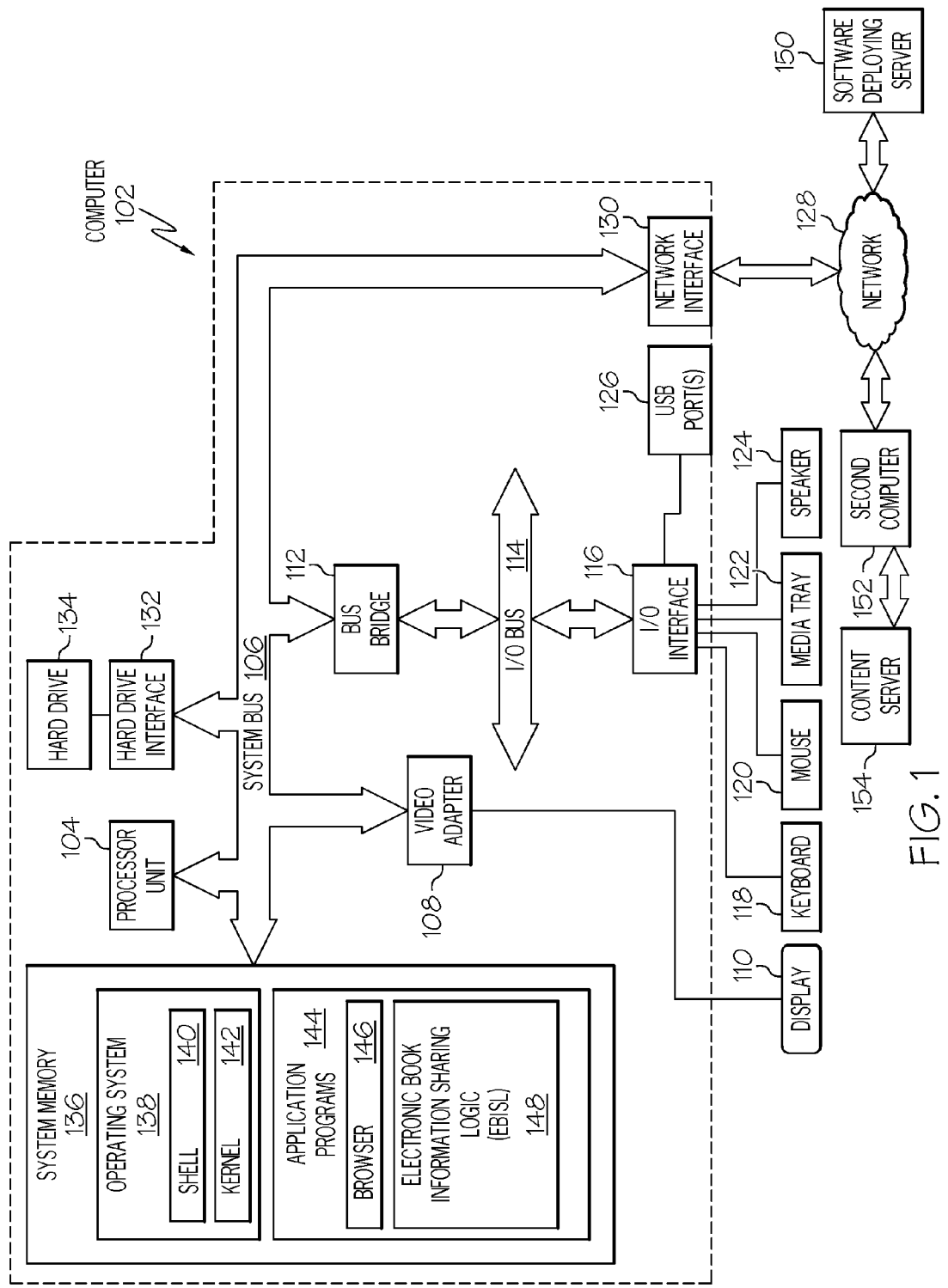
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a second computer 152 and/or a content server 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a speaker 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as second computer 152 and content server 154.

Application programs 144 in computer 102's system memory (as well as software deploying server 150's system memory) also include an electronic book information sharing logic (EBISL) 148. EBISL 148 includes code for implementing the processes described below, including those described in FIGS. 2-3. In one embodiment, computer 102 is able to download EBISL 148 from software deploying server 150, including in an on-demand basis, wherein the code in EBISL 148 is not downloaded until needed for execution. Note further that, in one embodiment of the present invention, software deploying server 150 performs all of the functions associated with the present invention (including execution of EBISL 148), thus freeing computer 102 from having to use its own internal computing resources to execute EBISL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
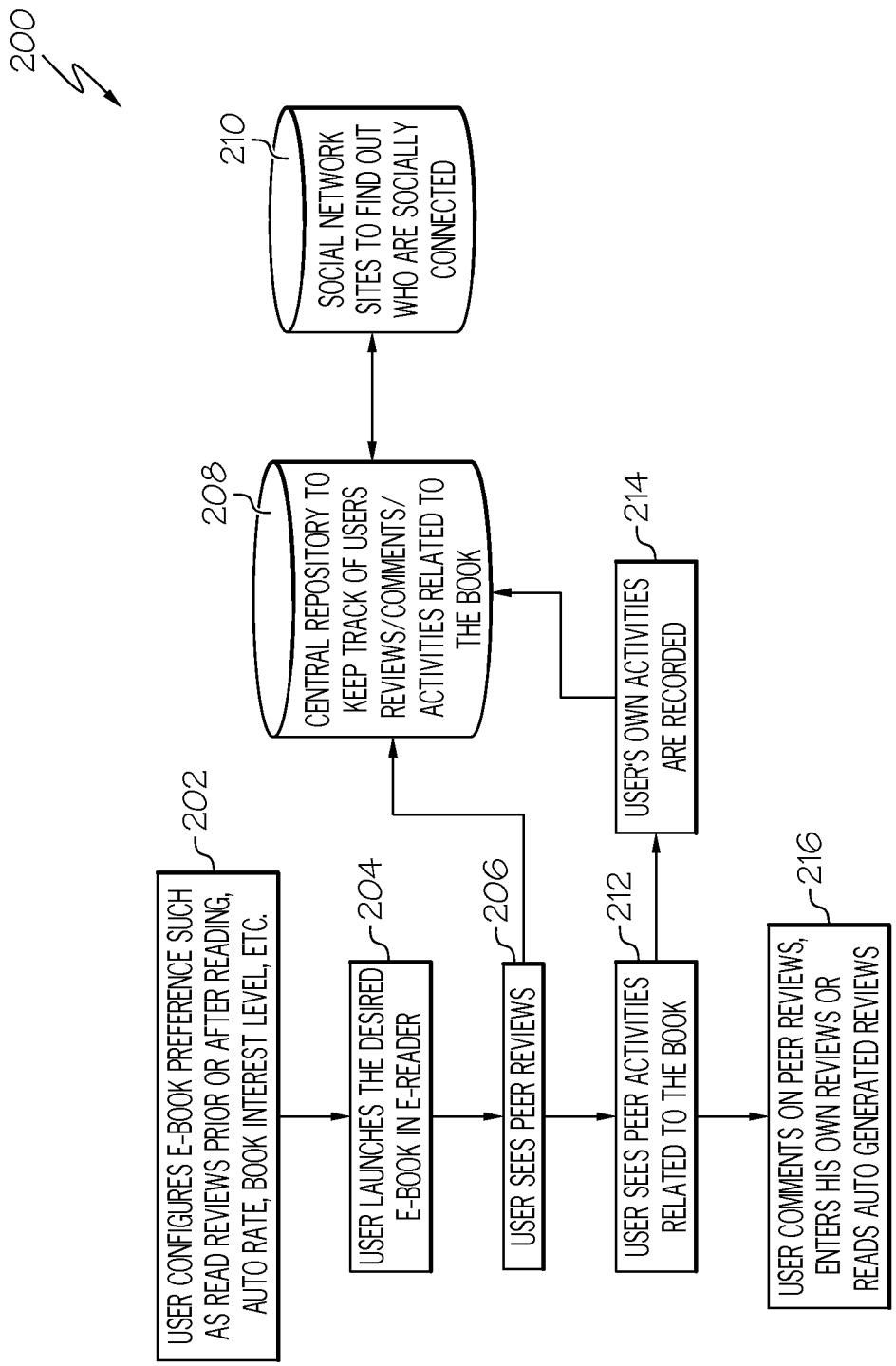
FIG. 2 illustrates an exemplary system for sharing information and/or help related to a passage from an electronic book.

With reference now to FIG. 2, an exemplary system 200 used for sharing information about a passage from an electronic book is presented. As described in block 202, a user of an electronic book (e-book) configures the e-book with personal preferences, such as whether or not the user desires to read comments/reviews/suggestions/ratings before or after reading the e-book (and/or a passage from the e-book). As described in block 204, after configuring the e-book with such personal preferences, the user launches a particular e-book on an e-reader, which may include the hardware/software depicted for computer 102 in FIG. 1. In accordance with the personal preferences that the user has set for this e-book (or alternatively, for any e-book opened on this e-reader), the user then views information received from members of a social network (block 206). This social network may be members of a same social networking service, members of a same subgroup (e.g., selected group of persons) to which the user is a member, members of a same work team to which the user belongs, etc.

Comments/advice presented by other members of the social network, including those of the current user who is reading the e-book, are stored in a repository 208. This repository 208, which may be the second computer 152 shown in FIG. 1, is coupled to a content server 210 (e.g., content server 154 shown in FIG. 1), which provides a link to other resources, including websites, wiki resources, social networking services, etc.

As described in block 212 of FIG. 2, the current user is also able to see peer activities related to the e-book that is being read. Examples of such peer activities include, but are not limited to, notes, comments, questions, factual disputes, etc. related to a particular e-book (or passage therein), as well as other activities such as establishing a discussion group related to the particular e-book, establishing a webpage and/or blog dedicated to the particular e-book, conducting an online search for additional information about the particular e-book, etc. All such activities may be determined based on network activity of members of the peer group, including monitoring search histories, generations of websites, etc. As described in block 214, a hypervisor or other computer (e.g., computer 102) may also record such activities performed by the current reader of the current e-book. Such activities, beyond those described for peer members, include, but are not limited to, commenting on peer reviews about the e-book, creation of new peer reviews about the e-book, etc. (block 216).

Figure 3:
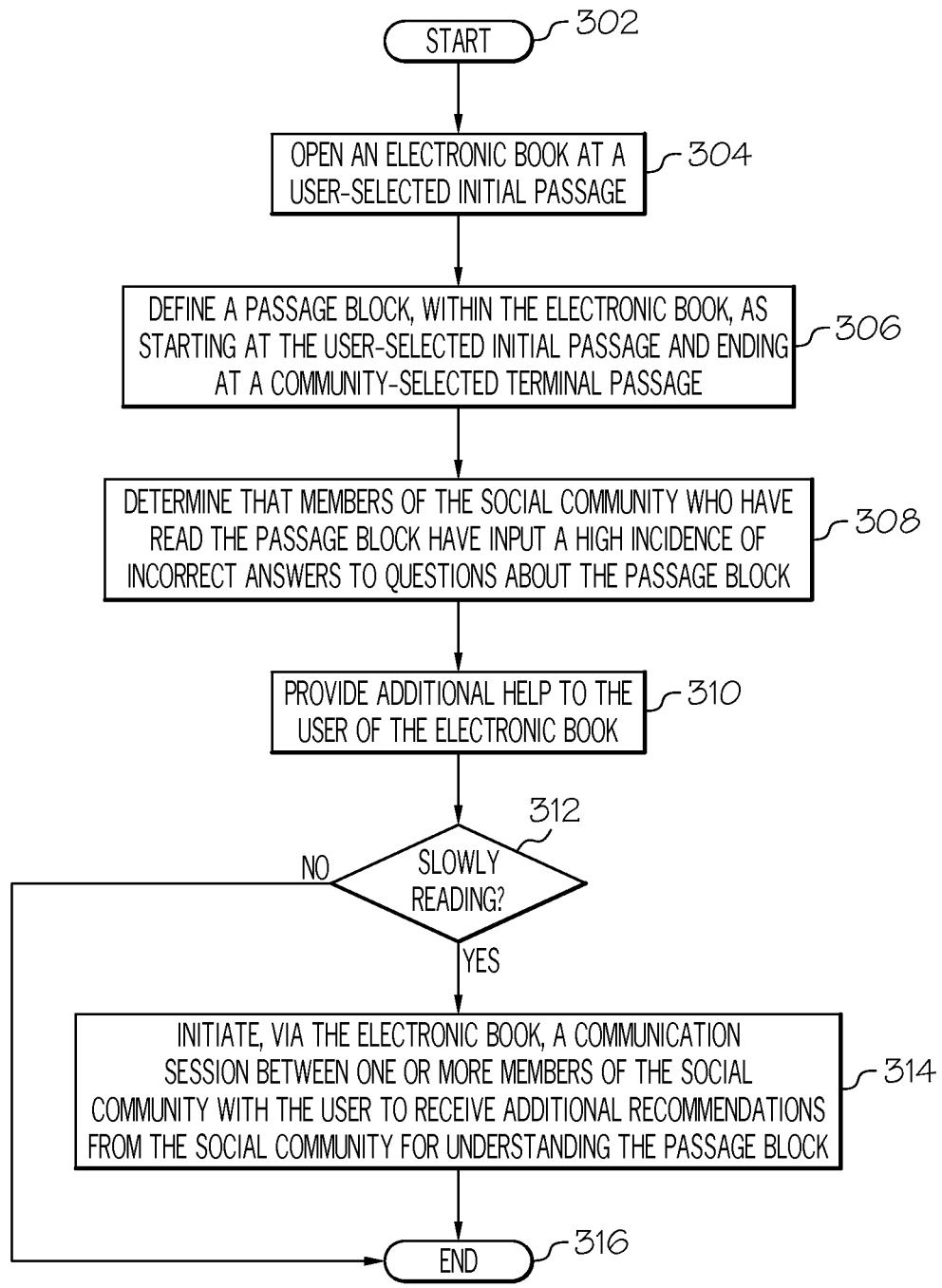
FIG. 3 is a high level flow chart of one or more exemplary steps taken by one or more processors to share information related to passages from an electronic book.

With reference now to FIG. 3, a high level flow chart of one or more exemplary steps taken by one or more processors to share information related to passages from an electronic book is presented. After initiator block 302, a user opens an electronic book (e-book) on an e-reader at a particular user-selected initial passage (block 304). For example, the user may open a book at Chapter 3, and/or at a particular paragraph.

As described in block 306, a passage block within the electronic book is defined. This passage block starts at the user-selected initial passage and ends at a community-selected terminal passage. Note that in one embodiment, the end of the passage is determined by members of a community, not the current user of the e-reader (who does determine/select the "user-selected initial passage"), and thus the end of the passage is a "community-selected terminal passage". That is, even though the current user may be a member of the community, he/she does not determine where the "community-selected terminal passage" is in the e-book. In another embodiment, however, the current reader is able to determine both the user-selected initial passage as well as the end of the passage to be processed in accordance with the present invention. In this other embodiment, the end of the passage, when determined by the current user, is not called the community-selected terminal passage. In either embodiment, the passage that extends from the user-selected initial passage to the community-selected terminal passage is known as the "passage block", which may include a word, line, paragraph, chapter, section, or entire e-book, as well as sub-sections of any of these passages. For example, if the user started at Chapter 3 of the e-book (as presented in the example above), the passage block may go from Chapter 3 to Chapter 5 (the "community-selected terminal passage").

As described in block 308, a determination is made that members of the social community who have read the passage block have input a high incidence of incorrect answers to questions about the passage block, where the high incidence is greater than a predetermined value. For example, assume that the passage block is from a textbook, which has questions at the end of each chapter. Assume also that, when answering these questions (e.g., on-line or in some other manner that is discernible/locatable by one or more processors associated with the current e-reader), a certain predetermined percentage of the members of the social community (to which the current user may or may not be a member) answered more than some predetermined quantity/percentage of these questions incorrectly.

For example, assume that the e-book is a textbook that has 10 questions at the end of a particular chapter. A determination is made that previous persons (i.e., members of the social community) have incorrectly answered questions 1, 3 and 7 more than 50% of the time in the past. Thus, members of the social community offer help to the current user/reader regarding the concepts tested by these questions 1, 3, and 7. This help may come in any formed discussed herein, such as a synopsis of the chapter, suggested reference materials/webpages/etc., personal comments/advice/information generated by members of the social community, etc.

As described in block 310, additional help is provided to the user of the electronic book to better understand, and thus be able to answer questions about, the passage block. This additional help is information that members of the social community have deemed to be useful in correctly answering questions that had the high incidence of incorrect answers.

In one embodiment, the additional help from the community group comes in the form of a suggestion from the social community to read the passage block at a single sitting. A processing entity, such as the electronic book reader, is able to selectively identify and receive this suggestion from the social community. That is, a message (e.g., a suggestion from the social community sent from the social community to the electronic book reader) contains information that 1) identifies the relevant passage block to which the suggestion applies; 2) identifies the intended recipient of the message (since multiple users may use a same e-reader and/or read a same e-book); and 3) provides the suggested help for the identified passage block (either for the intended recipient or for a generic population). If the user of the e-reader (to whom the message is addressed) has set up the e-reader (and/or the current e-book) to receive suggestions from the social community, this suggestion is then displayed on the e-reader. Other messages from the social community, which are identified and received by the e-reader, include, but are not limited to, a suggestion from the social community to read the passage block and another section from the electronic book at a single sitting; a synopsis of the passage block; and/or explanatory notes that describe concepts presented within the passage block.

In one embodiment, the additional help is identified, by one or more processors, as either coming from a social community to which the user is a current member or from a social community to which the user is not a current member. That is, the present user of the e-reader (i.e., the user who is currently reading the e-book and who may be offered help in reading a particular passage block) may be a member of one social community (e.g., a community chat room) but not another. If the additional help comes from the social community to which the present user is a member, it will be visually coded (i.e., colored, shaded, or otherwise given a visual trait) in a manner that is unique for that social community. Help that comes from other social communities is visually coded differently, such that when help is presented to the present user from both social communities, the different help sources are readily identified according to their respective visual coding.

As described in query block 312, a query is made as to whether the current reader of the e-book is taking longer than some predetermined amount of time to read the passage block. If so, then additional help is provided to the current reader. In one embodiment, this additional help comes in the form of initiating a communication session between one or more members of the social community and the user (block 314), where the communication session enables the user to receive additional recommendations from the social community for understanding the passage block. This communication session may be via the e-reader (assuming that it is enabled with network communication ability), a phone call, an on-line discussion group on the Internet, etc.

The process ends at terminator block 316.

As described herein, the present invention presents a system, method and/or computer program product to leverage social information that is relevant to the user to help and guide users in reading e-books. The user may or may not be aware of who in his social network contacts has read this book when he makes the purchase decision to purchase a particular e-book. The present invention, however, allows the user to know chapters (passage blocks) his social network contacts enjoyed most, have finished to date, and/or which chapters they recommend that all members of the social network group read together.

The present invention thus provides the ability for persons reading e-books to access (and/or provide) reviews for each passage block from users within or outside of the user's social network contacts. Additional information, such as who recently read the particular passage block, which persons are currently in the middle of reading the chapter or other passage block, what each of the persons thought were the main concepts to understand from the chapter, and whether it is recommended to read a particular chapter/passage with any other following chapters together can be presented to the current reader of the e-book. This information can be used by the readers (persons) to learn about relevant information for the book/chapter from social network contacts, and to generate discussion topics when the user communicates with his social network contacts.

For example, assume that "User A" is a person who downloaded a particular e-book entitles "Hit E-book". While User A starts reading a particular passage block (e.g., a particular chapter), the system presented herein records where she is in reading, as well as her reading speed and the time she spent on each page. The system collects that information and publishes it to an e-readers' repository associated with this e-book. At each chapter, the system provides the opportunity for User A to enter comments for the chapter she just read, or the system can automatically rate the chapters for User A (e.g., if she spent extra time on reading the chapter or reading the chapter back and forth a couple of times). User A can add thoughts to certain pages, star certain pages, or thoughts for each chapter of main concepts. The system also allows User A to rate each chapter and/or the complete e-book.

In one embodiment, while User A is reading the e-book, but before starting each chapter or other passage block, the system (e.g., logic associated with repository 208 shown in FIG. 2) determines if there is anyone from User A's social network contacts who rated/reviewed that chapter in the e-book. If so, the system determines whether anyone provided information (such as which chapters should be read together) and propagates that information to User A so User A can be sure that she has a large enough time slot to read the chapters (i.e., to read them together such that they make sense and/or are otherwise understandable). After User A finishes reading the chapter/passage block, the system can provide the ratings/comments from her social network contacts regarding the chapter/passage block, and User A can choose whether she agrees with one or more comments or even enter her own comments. If User A was confused by the concepts of this chapter/passage block, she can review the other users' thoughts so that she has a better understanding before reading the next chapter. Other users also may have communicated their thoughts not just for the chapter, but for individual pages, and User A can also star certain pages as important, or can suggest to others that they read this page/passage block more than once. Thus, if User A was confused, she has extra sources of information to help her in understanding the passage block. Note that the relevant review/rating information provided to User A will be at the chapter level, entire book level, or any other passage block level determined by User A and/or the social community of other users/readers.

In one embodiment, the comments from other users/readers are automatically injected/inserted into the e-book on the e-reader, such that the current user can see the e-book and the comments/clips from others all at once in the same place. In some cases, only the comments/clips from the user's social network contacts will be displayed or prioritized higher, as discussed herein.

In one embodiment, the current user's comments are created and published to a comments Web site automatically, based on the current user's behavior (such as spending extra time reading a particular chapter/passage block, reading these two chapters together, etc.). For example, when the user spends extra time reading a chapter, the system will assume the user is either very interested in the chapter or the user is having difficulty understanding it. The system can check to see if one of the user's friends has commented on the same chapter or read the same chapter in order to see if the friend can help the user. If the user of the e-reader (or other users) had to reference an external browser page or reference other pages of the e-book to look up definitions or topics etc., the system detects it (e.g., by tracking an electronic footprint of the user or other users). The system therefore can determine if the user is struggling with an e-book page or section, in order to offer information and definitions referenced by other users in the social network. Furthermore, in one embodiment the system conveys information obtained by the current user, while reading this e-book or page, to others in the social network.

In one embodiment, comments are injected/inserted only when the user is spending more time on the page than usual, or looking up words in the page.

As described herein, for e-books that contain questions for review (such as textbooks), the system can determine if most people struggle with certain questions and/or need to go back to reread chapters to answer the question. The system can determine average user behavior on each question and use that to flag specific questions and offer additional help for users, such as definitions, and additional references.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of sharing information related to passages from an electronic book, the method comprising:
    opening, by one or more processors, an electronic book at a user-selected initial passage, wherein the electronic book is displayed to a user on an electronic book reader;
    defining, by one or more processors, a passage block within the electronic book, wherein the passage block starts at the user-selected initial passage and ends at a community-selected terminal passage, wherein the community-selected terminal passage is selected by members of a social community who have read the passage block;
    determining, by one or more processors, that members of the social community who have read the passage block have input a high incidence of incorrect answers to questions about the passage block, wherein the high incidence is greater than a predetermined value;
    automatically providing, by one or more processors, help to the user of the electronic book to whom the passage block has been displayed, wherein the help is information that members of the social community have deemed to be useful in correctly answering questions that had the high incidence of incorrect answers; and
    in response to the user of the electronic book reader taking longer than a predetermined amount of time to read the passage block, initiating, via one or more processors, a communication session between one or more members of the social community and the user, wherein the communication session enables the user to receive recommendations from the social community for understanding the passage block.

2. The method of claim 1, further comprising:
selective identifying and receiving, by the electronic book reader, a suggestion from the social community to read the passage block at a single sitting.

3. The method of claim 1, further comprising:
selective identifying and receiving, by the electronic book reader, a suggestion from the social community to read the passage block and another section from the electronic book at a single sitting.

4. The method of claim 1, further comprising:
selective identifying and receiving, by the electronic book reader, a synopsis of the passage block from the social community.

5. The method of claim 1, further comprising:
selective identifying and receiving, by the electronic book reader, explanatory notes that describe concepts presented within the passage block from the social community.

6. The method of claim 1, further comprising:
identifying, by one or more processors, the help as coming either from a social community to which the user is a current member or from a social community to which the user is not a current member; and
visually coding and displaying the help according to whether the help came from the social community to which the user is a member or from the social community to which the user is not a current member.

7. A computer program product for sharing information related to passages from an electronic book, the computer program product comprising a non-transitory computer readable storage medium having program code embodied therewith, the program code readable and executable by one or more processors to perform a method comprising:
    opening an electronic book at a user-selected initial passage, wherein the electronic book is displayed to a user on an electronic book reader;
    defining a passage block within the electronic book, wherein the passage block starts at the user-selected initial passage and ends at a community-selected terminal passage, wherein the community-selected terminal passage is selected by members of a social community who have read the passage block;
    determining that members of the social community who have read the passage block have input a high incidence of incorrect answers to questions about the passage block, wherein the high incidence is greater than a predetermined value;
    automatically providing help to the user of the electronic book to whom the passage block has been displayed, wherein the help is information that members of the social community have deemed to be useful in correctly answering questions that had the high incidence of incorrect answers; and
    in response to the user of the electronic book reader taking longer than a predetermined amount of time to read the passage block, initiating a communication session between one or more members of the social community and the user, wherein the communication session enables the user to receive recommendations from the social community for understanding the passage block.

8. The computer program product of claim 7, further comprising program code that is readable and executable by one or more processors to:

selectively identify and receive a suggestion from the social community to read the passage block at a single sitting.

9. The computer program product of claim 7, further comprising program code that is readable and executable by one or more processors to:
selectively identify and receive a suggestion from the social community to read the passage block and another section from the electronic book at a single sitting.

10. The computer program product of claim 7, further comprising program code that is readable and executable by one or more processors to:
selectively identify and receive a synopsis of the passage block from the social community.

11. The computer program product of claim 7, further comprising program code that is readable and executable by one or more processors to:
selectively identify and receive explanatory notes that describe concepts presented within the passage block from the social community.

12. The computer program product of claim 7, further comprising program code that is readable and executable by one or more processors to:
identify the help as coming either from a social community to which the user is a current member or from a social community to which the user is not a current member; and
visually code and display the help according to whether the additional help came from the social community to which the user is a member or from the social community to which the user is not a current member.

13. A computer system comprising:
a processor, a computer readable memory, and a computer readable storage medium;
first program instructions to open an electronic book at a user-selected initial passage, wherein the electronic book is displayed to a user on an electronic book reader;
second program instructions to define a passage block within the electronic book, wherein the passage block starts at the user-selected initial passage and ends at a community-selected terminal passage, wherein the community-selected terminal passage is selected by members of a social community who have read the passage block;
third program instructions to determine that members of the social community who have read the passage block have input a high incidence of incorrect answers to questions about the passage block, wherein the high incidence is greater than a predetermined value;
fourth program instructions to automatically provide help to the user of the electronic book to whom the passage block has been displayed, wherein the help is information that members of the social community have deemed to be useful in correctly answering questions that had the high incidence of incorrect answers; and
fifth program instructions, to in response to the user of the electronic book reader taking longer than a predetermined amount of time to read the passage block, initiate a communication session between one or more members of the social community and the user, wherein the communication session enables the user to receive recommendations from the social community for understanding the passage block; and wherein
the first, second, third, fourth, and fifth program instructions are stored on the computer readable storage medium for execution by the processor via the computer readable memory.

14. The computer system of claim 13, further comprising:
sixth program instructions to selectively identify and receive a suggestion from the social community to read the passage block at a single sitting; and wherein
the sixth program instructions are stored on the computer readable storage medium for execution by the processor via the computer readable memory.

15. The computer system of claim 13, further comprising:
sixth program instructions to selectively identify and receive a synopsis of the passage block from the social community; and wherein
the sixth program instructions are stored on the computer readable storage medium for execution by the processor via the computer readable memory.

16. The computer system of claim 13, further comprising:
sixth program instructions to selectively identify and receive explanatory notes that describe concepts presented within the passage block from the social community; and wherein
the sixth program instructions are stored on the computer readable storage medium for execution by the processor via the computer readable memory.

17. The computer system of claim 13, further comprising:
sixth program instructions to identify the additional help as coming either from a social community to which the user is a current member or from a social community to which the user is not a current member; and
seventh program instructions to visually code and display the help according to whether the help came from the social community to which the user is a member or from the social community to which the user is not a current member; and wherein
the sixth and seventh program instructions are stored on the computer readable storage medium for execution by the processor via the computer readable memory.

* * * * *